United States Patent [19]

Imamura

[11] Patent Number: 5,585,938
[45] Date of Patent: Dec. 17, 1996

[54] FACSIMILE MACHINE FOR TRANSMITTING INFORMATION INDICATIVE OF THE SAME COMMUNICATION MODE IN BOTH STANDARD AND NON-STANDARD PROCEDURE SIGNALS

[75] Inventor: Nobuko Imamura, Kyoto, Japan

[73] Assignee: Murata Kikai Kabushiki Kaisha, Kyoto, Japan

[21] Appl. No.: 365,062

[22] Filed: Dec. 28, 1994

Related U.S. Application Data

[63] Continuation of Ser. No. 163,063, Dec. 6, 1993, abandoned.

[30] Foreign Application Priority Data

Dec. 17, 1992 [JP] Japan .................................. 4-337176

[51] Int. Cl.$^6$ ...................................... H04N 1/00
[52] U.S. Cl. ........................ 358/434; 358/435; 358/436; 358/438; 358/439
[58] Field of Search .................................. 358/434, 435, 358/436, 438, 439, 400, 468; 379/100, 93, 90; H04N 1/00

[56] References Cited

U.S. PATENT DOCUMENTS

| | | | |
|---|---|---|---|
| 4,727,429 | 2/1988 | Ueno | 358/405 |
| 4,885,755 | 12/1989 | Yoshida | 358/438 |
| 5,125,025 | 6/1992 | Lin | 358/434 |
| 5,274,462 | 12/1993 | Satoh | 358/428 |
| 5,418,628 | 5/1995 | Perkins | 358/468 |

OTHER PUBLICATIONS

Fax: Digital Facsimile Technology & Applications 2nd Edition, D. Bodson, K. McConnell, R. Schaphrost 1992, pp. 36–49.

*Primary Examiner*—Kim Vu
*Assistant Examiner*—Kimberly A. Williams
*Attorney, Agent, or Firm*—Loeb & Loeb LLP

[57] ABSTRACT

When a protocol signal is transmitted between a facsimile machine which operates under new ITU-T Recommendation and another facsimile machine which operates under old ITU-T Recommendation, a certain functional bit to specify a particular function of the new facsimile machine may not be understood by the old facsimile machine if such a functional bit is previously included in a protocol signal for non-standard procedure but now included in a protocol signal for standard procedure. If the old facsimile machine does not interpret the functional bit, a desired communication cannot be conducted between the two facsimile machines. To avoid such a case, a prescribed functional bit is included in both a protocol signal for standard procedure and a protocol signal for non-standard procedure. The functional bit included in the protocol signal for non-standard procedure will be understood by the old facsimile machine. When both facsimile machines operate under new ITU-T Recommendation, the functional bit included in the protocol signal for standard procedure establishes the desired mode of communication.

9 Claims, 3 Drawing Sheets

FACSIMILE MACHINE FOR TRANSMITTING INFORMATION INDICATIVE OF THE SAME COMMUNICATION MODE IN BOTH STANDARD AND NON-STANDARD PROCEDURE SIGNALS

This is a continuation of application Ser. No. 08/163,063 filed on Dec. 6, 1993, now abandoned.

BACKGROUND OF THE INVENTION

1. Technical Field

The present invention relates to a facsimile machine.

2. Background Art

Recently, facsimile machines should be constructed in line with ITU-T Recommendation. ITU-T Recommendation T.30 defines standard and non-standard procedures with respect to protocol signal transmission performed prior to image data transmission.

The standard procedure is a requisite to all facsimile machines, but the non-standard procedure is not. Therefore, the non-standard procedure may be performed as additional functions of the facsimile machine.

Between two conventional facsimile machines, a protocol signal for the standard procedure which is provided with a functional bit to perform a function of the facsimile machine defined in standard procedure is transmitted to one facsimile machine from another facsimile machine. Other functions which are not defined in the standard procedure are executed upon transmission of functional bits included in a protocol signal for the nonstandard procedure.

Specifically, if ITU-T recommends to transmit to a third party a functional bit which represents availability of fine mode reception (vertical resolution=7.7 l/mm) in the protocol signal for the standard procedure, the facsimile machine transmits such a functional bit to the third party during the standard procedure and does not transmit it during the non-standard procedure.

However, this type of facsimile machine has following problems:

Contents of the ITU-T Recommendation will change with progress of functions of the facsimile machines. Thus, even if today's ITU-T Recommendation does not include a functional bit for superfine (vertical resolution is 15.4 lines/mm) mode in the standard procedure, tomorrow's ITU-T Recommendation might include it.

If new ITU-T Recommendation issues, then a facsimile machine manufactured thereafter transmits protocol signal which has a functional bit for the superfine mode in standard procedure. On the other hand, facsimile machines manufactured under previous ITU-T Recommendation and already used in offices and homes do not understand a newly added functional bit since such a functional bit should be included in a protocol signal for the non-standard procedure under old ITU-T Recommendation.

Therefore, two facsimile machines manufactured under new ITU-T Recommendation can communicate with each other. Also, a facsimile machine of old ITU-T Recommendation and that of new ITU-T Recommendation can communicate with each other. But, even if a functional bit for the superfine mode is sent to a facsimile machine of old ITU-T Recommendation from a facsimile machine of new ITU-T Recommendation, the former cannot understand such a functional bit so that the image data transmission is not conducted in the superfine mode between these two facsimile machines.

SUMMARY OF THE INVENTION

An object of the present invention is to provide a facsimile machine which operates under new ITU-T Recommendation and can appropriately communicate with another facsimile machine which operates under previous ITU-T Recommendation even if a certain communication function is previously defined as a function in non-standard procedure but now defined as a function in standard procedure upon change ITU-T Recommendation or the like.

According to one aspect of the present invention, there is provided a facsimile machine characterized in that when a protocol signal for control of image data transmission is transmitted between the facsimile machine and another facsimile machine prior to transmission of image data, a prescribed functional bit concerning a certain facsimile function which is defined as a function for non-standard procedure under old ITU-T Recommendation but defined as a function for standard procedure under new ITU-T Recommendation is included in both a protocol signal for standard procedure and a protocol signal for nonstandard procedure sent to the another facsimile machine.

When the protocol signals are transmitted between the facsimile machine of the present invention and the other facsimile machine (receiving side) prior to the image data transmission, the facsimile machine of the present invention transmits the protocol signal for standard procedure and the protocol signal for non-standard procedure, both of which protocol signals include the same prescribed functional bit that is newly added under new ITU-T Recommendation.

Therefore, even if the facsimile machine on the receiving side cannot understand the functional bit included in the standard procedure protocol sent from the facsimile machine on the calling side, it can understand the same functional bit included in the non-standard procedure protocol.

As a result, the facsimile machine operates under new ITU-T Recommendation and that operates under old ITU-T Recommendation can communicate with each other appropriately.

It should be noted that if the facsimile machine on the receiving side also operates under new ITU-T Recommendation, a functional bit added under new ITU-T Recommendation is understandable on the receiving side when the protocol signal for standard procedure is received, so that the functional bit is processed in the standard procedure.

DETAILED DESCRIPTION OF THE PREFERRED EMBODIMENTS

Preferred embodiments of the present invention will be described referring to the accompanying drawings.

Figure 1:
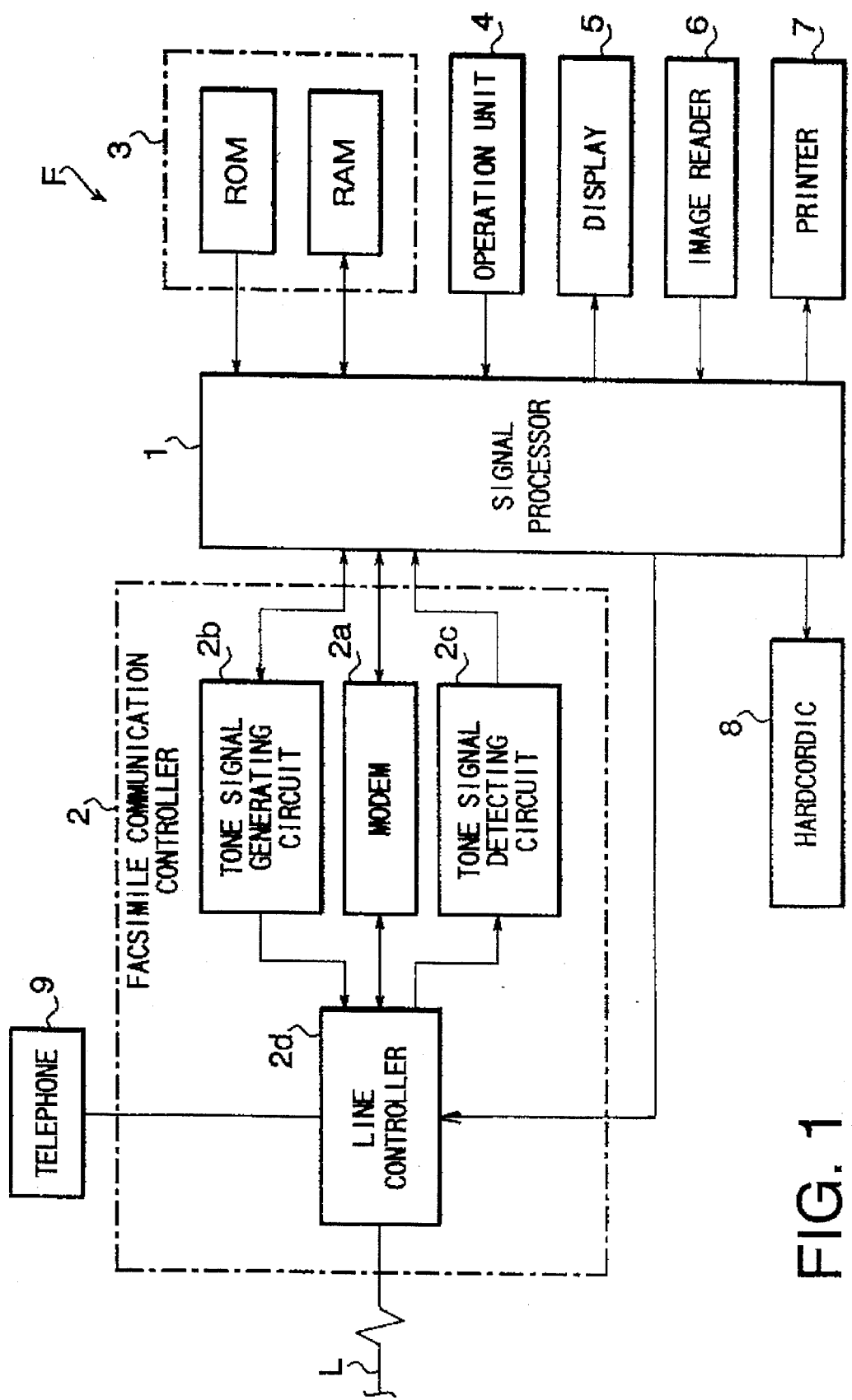
FIG. 1 is a block diagram of a facsimile machine according to the present invention.

Referring to FIG. 1, a facsimile machine F of the present invention includes a signal processor 1, a facsimile communication controller 2, a memory 3, an operation unit 4, a display 5, an image reader 6, a printer 7 and a hardcordic 8. The signal processor 1 may include a CPU. The controller 2 is connected with the signal processor 1. The memory 3 includes a ROM and a RAM. The operation unit 4 includes ten keys and various keys/switches necessary for communication or manipulation. The display 5 may be an LCD. The image reader 6 scanreads image on a document. The printer 7 prints image on a recording sheet. The cordec 8 performs coding/decoding of image data.

The facsimile communication controller 2 includes a modem 2a for transmitting/receiving image data and a protocol signal (communication control signal of binary coded format), a tone signal generator 2b for generating/detecting a protocol signal (tonal signal such as CNG signal and CED signal) and a tone signal detector 2c.

Further, the facsimile communication controller 2 includes a line controller 2d which switches connection-with-a-line L from the modem 2a to a telephone 9 or vice versa.

The signal processor 1 controls the facsimile communication controller 2 and other components to perform facsimile communication according to a communication program stored in the memory 3 and commands input by an operator who manipulates the operation unit 4. Specifically, the signal processor 1 conducts the following control:

If there is a call from a facsimile machine which operates under old ITU-T Recommendation (referred to as "old facsimile machine"), the facsimile machine F of the present invention which operates under new ITU-T Recommendation detects the call and a CNG (calling tone) signal is transmitted from the old facsimile machine. Then, the signal processor 1 first causes the facsimile communication controller 2 to send a CED (called station identification) signal and then an NSF (nonstandard facilities) signal and/or CSI (called subscriber identification) signal to the old facsimile machine (the NSF and CSI signals are optional signals for non-standard procedure). After that, the signal processor i causes the controller 2 to send a DIS (digital identification signal) as a standard procedure signal.

It should be noted that both NSF signal and DIS signal are provided with functional bits which indicate, for example, that the image data transmission is possible in superfine mode, respectively.

On the other hand, when the facsimile machine F calls the old facsimile machine, a CNG signal is sent to the old facsimile machine on the called side from the facsimile machine F on the calling side upon signal reception (polarity reversal) on the called side. If an NSF signal (non-standard procedure signal) sent to the facsimile machine F includes a functional bit which indicates the availability of superfine mode reception and the operator of the facsimile machine F already sets the facsimile machine F to the superfine mode using the operation unit 4, not only a DCS (digital command signal) of standard procedure but also an NSS (non-standard set up) signal of non-standard procedure include functional bits which specify the superfine mode communication.

Now, operations of the facsimile machine F will be explained.

For easier explanation, this embodiment stands on an assumption that a functional bit for superfine mode is not included in the standard procedure under old ITU-T Recommendation but it is included in the standard procedure under new ITU-T Recommendation.

The facsimile machine F operates under new ITU-T Recommendation so that the functional bit for superfine mode is included in its standard procedure.

On the other hand, the other facsimile machine in this embodiment operates under old ITU-T Recommendation so that the functional bit for superfine mode is only included in the nonstandard procedure.

Figure 2:
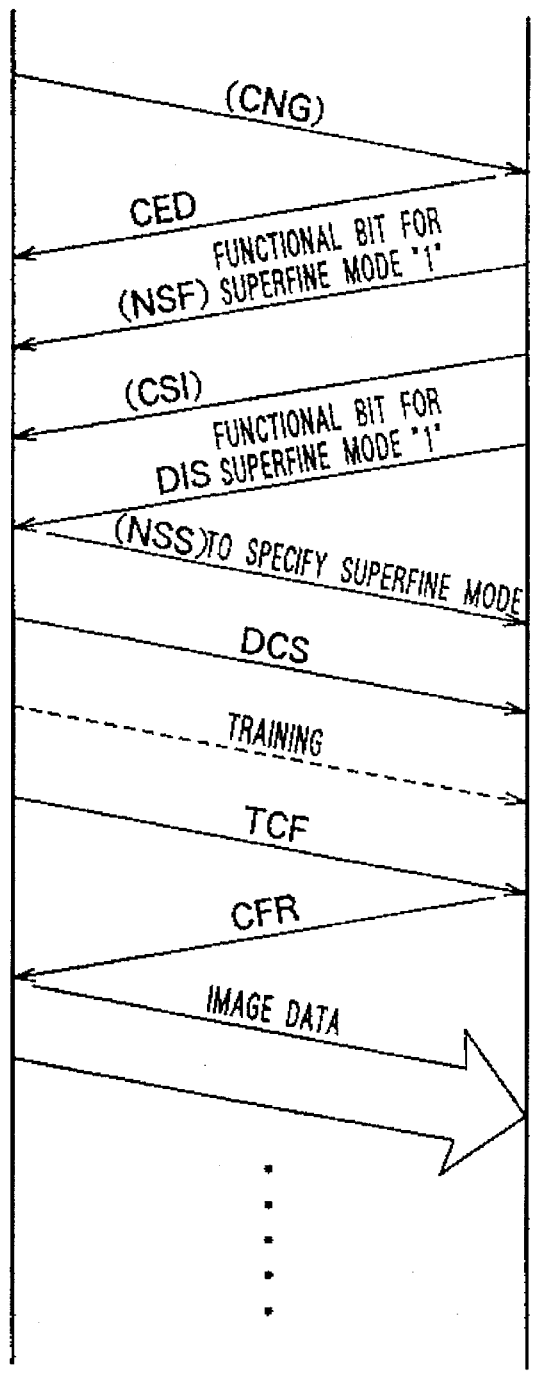
FIG. 2 is a timing chart to show communication between the facsimile machine of the present invention which operates under new ITU-T Recommendation and another facsimile machine which operates under old ITU-T Recommendation.

FIG. 2 illustrates a timing chart of facsimile communication between the facsimile machine F of the present invention and the old facsimile machine Fa.

In this illustration, signals without parentheses are signals of standard procedure under new ITU-T Recommendation whereas signals with parentheses are signals of non-standard procedure under new ITU-T Recommendation. Such is the case with FIG. 3.

In FIG. 2, after the facsimile machines F and Fa are connected to a mutual line, a CNG signal is transmitted to the facsimile machine F from the facsimile machine Fa on the calling side. Then, the facsimile machine F on the called side sends back a CED signal as a called terminal identification signal.

Subsequent to the transmission of CED signal, the facsimile machine F transmits an NSF signal as non-standard function identification signal, a CSI signal as a called terminal identification signal and a DIS signal which indicates that the facsimile machine F can receive data under ITU-T Recommendation.

Here, it should be noted that not only the DIS signal but the NSF signal include functional bits which indicate that the data/signal reception in the superfine mode is available at the facsimile machine F.

The facsimile machine Fa does not judge the functional bit in the DIS signal (standard procedure signal) which indicates the availability of superfine reception mode, but does judge the functional bit in the NSF signal (non-standard procedure signal) transmitted prior to the DIS signal which indicates the availability of superfine reception mode.

In other words, while the DIS signal of standard procedure is being transmitted to the facsimile machine Fa from the facsimile machine F, the facsimile machine Fa cannot understand that the facsimile machine F has the superfine reception mode. However, while the NSF signal of non-standard procedure is being transmitted, the facsimile machine Fa can judge whether or not the facsimile machine F has the superfine reception mode.

Therefore, if the facsimile machine Fa on the calling side has been set to the superfine mode of communication, the facsimile machine Fa transmits an NSS signal which includes a functional bit to specify the superfine mode communication.

As a result, the facsimile machines F and Fa can communicate with each other in the superfine mode. Specifically, the facsimile communication (or data transmission) in the superfine mode is initiated after specification of superfine mode, training and transmission of a TCF signal and/or CFR signal to the facsimile machine F on the called side.

FIG. 8 shows a case where the facsimile machine F of the present invention is a calling machine and the other facsimile machine Fa is a called machine.

As depicted, after the line connection between the facsimile machines F and Fa, a CNG signal is sent to the facsimile machine Fa from the facsimile machine F. Then, the facsimile machine Fa on the called side transmits a CED signal, an NSF signal, a CSI signal and a DIS signal to the facsimile machine F. It should be noted here that the functional bit for superfine mode is not included in the DIS signal (standard procedure signal), but included in the NSF signal (non-standard procedure signal).

The facsimile machine F detects the functional bit included in the NSF signal. If the facsimile machine F has been set to the superfine mode by the operator manipulating the operation unit 4, it transmits a DCS signal (standard procedure signal) and an NSS signal (non-standard procedure signal) which includes a functional bit indicating the availability of superfine mode.

Therefore, like the case of FIG. 2, the transmission and reception of the standard procedure signals do not specify the superfine mode, but those of the non-standard procedure signal establish the facsimile communication (data transmission) in the superfine mode.

Figure 3:
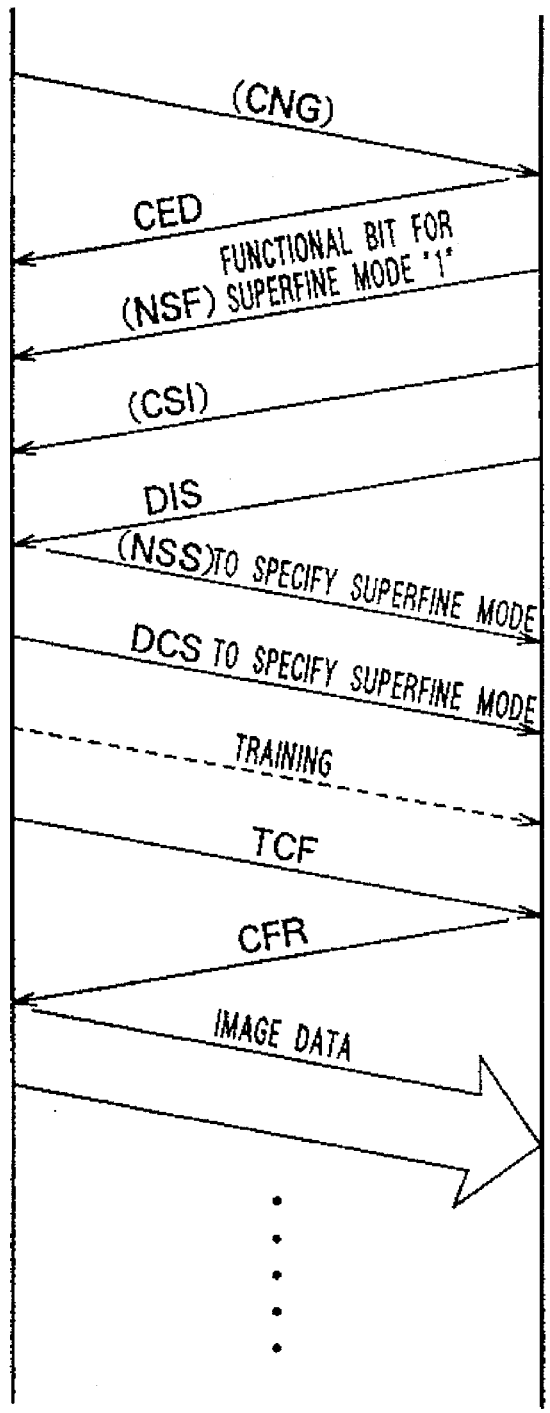
FIG. 3 is a timing chart to show another example of communication between the facsimile machine of the present invention and another facsimile machine.

The embodiments illustrated in FIG. 2 and 3 deal with cases where the facsimile machine Fa operates under old ITU-T Recommendation.

If the facsimile machine Fa also operates under new ITU-T Recommendation, transmitting the DIS signal of standard procedure will inform that the receiving side has a superfine mode and transmitting the DCS signal of standard procedure will establish the superfine mode of communication.

The present invention is not limited to the above embodiments or variations. The teaching of the present invention is applicable to various modes or functions of facsimile communication. Specifically, a concept of the present invention is embodied as long as a desired functional bit is included not only in a protocol signal for standard procedure but in a protocol signal for non-standard procedure.

Concrete manners of protocol signal transmission are not limited to those in the above examples. Further, concrete kinds or frame structures outputted as protocol signals are not limited to those in the above examples.

As explained above, according to the present invention, the particular same functional bit is included in both standard procedure signal and non-standard procedure signal so that even if the functional bit included in the standard procedure signal is not understood by a facsimile machine, the same functional bit included in the non-standard procedure signal will be understood by the facsimile machine.

Therefore, even if the ITU-T Recommendation changes, a facsimile machine which operates under old ITU-T Recommendation can communicates with another facsimile machine which operates under new ITU-T Recommendation.

What is claimed is:

1. A facsimile machine comprising:

means for at least one of transmitting a protocol signal for a standard procedure to a remote facsimile machine prior to transmission of image data and receiving a protocol signal for a standard procedure from a remote facsimile machine prior to transmission of image data, means for at least one of transmitting a protocol signal for a non-standard procedure to a remote facsimile machine prior to transmission of image data and receiving a protocol signal for a non-standard procedure from a remote facsimile machine prior to transmission of image data, the protocol signal for the standard procedure and the protocol signal for the non-standard procedure both including a prescribed functional bit representing a specific mode, means for transmitting a DIS signal to the remote facsimile machine before receiving image data from the remote facsimile machine, the DIS signal including the prescribed functional bit representing the specific mode, the DIS signal thereby transmitting to the remote facsimile machine information relating to the specific mode, and means for transmitting an NSF signal to the remote facsimile machine before receiving image data from the remote facsimile machine, the NSF signal also including the prescribed functional bit representing the specific mode, the NSF signal thereby also transmitting to the remote facsimile machine information relating to the specific mode, transmission of the DIS and NSF signals being carried out in a single protocol.

2. The facsimile machine of claim 1, wherein the prescribed functional bit is included in a protocol signal for a standard procedure under a first ITU-T Recommendation and wherein the prescribed functional bit is not included in a protocol signal for a standard procedure under a second ITU-T Recommendation.

3. The facsimile machine of claim 2, wherein the facsimile machine comprises a machine configured for operation in accordance with the first ITU-T Recommendation and wherein the remote facsimile machine comprises a machine configured for operation in accordance with the second ITU-T Recommendation.

4. The facsimile machine of claim 1, wherein the prescribed functional bit comprises a functional bit indicating availability of a superfine mode.

5. The facsimile machine of claim 1, comprising:

means for receiving a CNG signal from the remote facsimile machine before receiving image data from the remote facsimile machine, means for transmitting a CED signal to the remote facsimile machine after receiving a CNG signal from the remote facsimile machine and before receiving image data from the remote facsimile machine, and means for transmitting a CSI signal to the remote facsimile machine after receiving a CNG signal from the remote facsimile machine and before receiving image data from the remote facsimile machine.

6. The facsimile machine of claim 1, wherein the single protocol is a handshaking protocol.

7. A facsimile transmission method comprising:

at least one of the steps of transmitting a protocol signal for a standard procedure to a remote facsimile machine prior to transmission of image data and receiving a protocol signal for a standard procedure from a remote facsimile machine prior to transmission of image data, at least one of the steps of transmitting a protocol signal for a non-standard procedure to a remote facsimile machine prior to transmission of image data and receiving a protocol signal for a non-standard procedure from a remote facsimile machine prior to transmission of image data, including a prescribed functional bit representing a specific mode in both the protocol signal for the standard procedure and the protocol signal for the non-standard procedure, transmitting an NSF signal to the remote facsimile machine before receiving image data from the remote facsimile machine, the NSF signal including the prescribed functional bit representing the Specific mode, the NSF signal thereby transmitting to the remote facsimile machine information relating to the specific mode, transmitting a DIS signal to the remote facsimile machine before receiving image data from the remote facsimile machine, the DIS signal also including the prescribed functional bit representing the specific mode, the DIS signal thereby also transmitting to the remote facsimile machine information relating to the specific mode, transmission of the DIS and NSF signals being carried out in a single protocol.

8. The facsimile transmission method of claim 7, wherein the single protocol is a handshaking protocol.

9. A facsimile transmission method comprising:

at least one of the steps of transmitting a protocol signal for a standard procedure to a remote facsimile machine prior to transmission of image data and receiving a protocol signal for a standard procedure from a remote facsimile machine prior to transmission of image data, at least one of the steps of transmitting a protocol signal for a non-standard procedure to a remote facsimile machine prior to transmission of image data and receiving a protocol signal for a non-standard procedure from a remote facsimile machine prior to transmission of image data, including a prescribed functional bit representing a specific mode in both the protocol signal for the standard procedure and the protocol signal for the non-standard procedure, transmitting an NSF signal to the remote facsimile machine before receiving image data from the remote facsimile machine, the NSF signal including the prescribed functional bit representing the specific mode, the NSF signal thereby transmitting to the remote facsimile machine information relating to the specific mode, transmitting a DIS signal to the remote facsimile machine before receiving image data from the remote facsimile machine, the DIS signal also including the prescribed functional bit representing the specific mode, the DIS signal thereby also transmitting to the remote facsimile machine information relating to the specific mode, transmission of the DIS and NSF signals being carried out in a single protocol, receiving a CNG signal from the remote facsimile machine before receiving image data from the remote facsimile machine, transmitting a CED signal to the remote facsimile machine after receiving a CNG signal from the remote facsimile machine and before receiving image data from the remote facsimile machine, and transmitting a CSI signal to the remote facsimile machine after receiving a CNG signal from the remote facsimile machine and before receiving image data from the remote facsimile machine.

* * * * *